Feb. 27, 1968 J. J. VAN ACKER ET AL 3,370,701

CARD FILE

Filed June 4, 1965 4 Sheets-Sheet 1

INVENTORS.
JOHN J. VANACKER
DARWIN S. CROUSER
CLARENCE R. KORFMANN

BY Russell L. Root
ATTORNEY.

CARD FILE

INVENTORS.
JOHN J. VAN ACKER
DARWIN S. CROUSER
CLARENCE R. KORFMANN
BY Russell L. Root
ATTORNEY.

Feb. 27, 1968 J. J. VAN ACKER ET AL 3,370,701

CARD FILE

Filed June 4, 1965 4 Sheets-Sheet 3

INVENTORS.
JOHN J. VANACKER
DARWIN S. CROUSER
CLARENCE R. KORFMANN
BY Russell L. Root
ATTORNEY.

CARD FILE

Filed June 4, 1965 4 Sheets-Sheet 4

INVENTORS.
JOHN J. VANACKER
DARWIN S. CROUSER
CLARENCE R. KORFMANN
BY Russell L. Root
ATTORNEY.

United States Patent Office 3,370,701
Patented Feb. 27, 1968

3,370,701

CARD FILE

John J. Van Acker, Chesterland, and Darwin S. Crouser and Clarence R. Korfmann, Mentor, Ohio, assignors to Addressograph Multigraph Corporation, Cleveland, Ohio, a corporation of Delaware Filed June 4, 1965, Ser. No. 461,388
9 Claims. (Cl. 206—73)

ABSTRACT OF THE DISCLOSURE

A card file for retaining cards in shingled overlapping positions with the top edge of each successive rear card projecting beyond the one in front. The file includes a pair of side walls, a bottom and a plurality of separator plates positioned in parallel diagonal grooves provided in the side walls. Each adjacent pair of separator plates forms a sloping card retaining pocket such that cards will settle by gravity to the bottom of the pocket in a wide range of file positions including horizontal, and such that the cards will also settle by gravity to an aligned position with one edge thereof against one of the side walls. Sliding dovetail connectors are provided on the exterior surfaces of the side walls for releasably attaching two or more files in side by side positions. A stand and a base are provided for supporting, respectively, a single card file or a plurality of card files at different selected elevational angles.

The present invention relates to a card file and, more particularly, to a card file for storing embossed plastic cards and/or metal address plates for ready access and refiling.

Traditional advantages manifested in the self-writing plastic card promoted the spread of its use beyond the retail credit field into various business system applications. These applications created a need for a filing medium compatible with the system procedures for which the card was used. Although filing cabinets and drawers for metal plates are available, they do not lend themselves to the requirements which emphasize quick look-up and return on a random selection basis. In some cases, existing filing equipment designed for holding paper card records has been modified and utilized in an attempt to fill the void. However, while this proved to be a satisfactory answer in some instances, it still does not meet the exacting requirements of many applications.

The novel card file of the present invention provides a solution to the specific needs of a major industry, with sufficient in-built flexibility to permit its use for similar applications where a premium is placed on an efficient compact file to implement the system. The card file embodies a combination of exceptional features that far surpass anything commercially available with respect to appearance, operational efficiency, flexibility and economy.

It is an object of the present invention to provide a molded plastic tray or rack for filing cards in a vertical overlapping position with the top edge of each successive rear card projecting above the one in front.

Another object of the invention is to provide means to cause the cards to settle automatically against a common side of the tray when they are dropped into place, thus keeping them in alignment and making the unit particularly adaptable to various width cards.

Another object of the invention is to provide means for storing the cards in a readily accessible position where the corner of each card is so disposed that it can be easily grasped for removal from the file.

Another object of the invention is to provide visual means which serves as a positive reference for quick return of a card to its proper place in the file.

Another object of the invention is to provide a stand to support the card file at different angles of elevation from horizontal.

Another object of the invention is to provide means to permit two or more card file units to be attached side by side, thus creating a single unit of greater capacity.

Another object of the invention is to provide a base capable of holding a plurality of card file units side by side and one behind the other.

Another object of the invention is to provide the base with means to permit positioning the files at different elevational angles, and additional means to permit the card file units at the front of the base to be pivoted forward to gain access to the files therebehind.

In general, the above objects and others may be attained in accordance with the practice of the present invention by providing a card file having a plurality of vertical pockets formed by individual separator plates. The separators are provided with angled card support means which permit the cards to slide downwardly on the support by gravity, thus providing for self-aligning of the cards against a common edge of the card file. At the same time, the angled support causes one edge of the card to extend upwardly, thereby positioning the card within easy grasp for removal from the file.

Other and further objects and advantages of the present invention will be apparent from the following description and claims and are illustrated in the accompanying drawings which, by way of illustration, show the preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

Figures 1, 2:
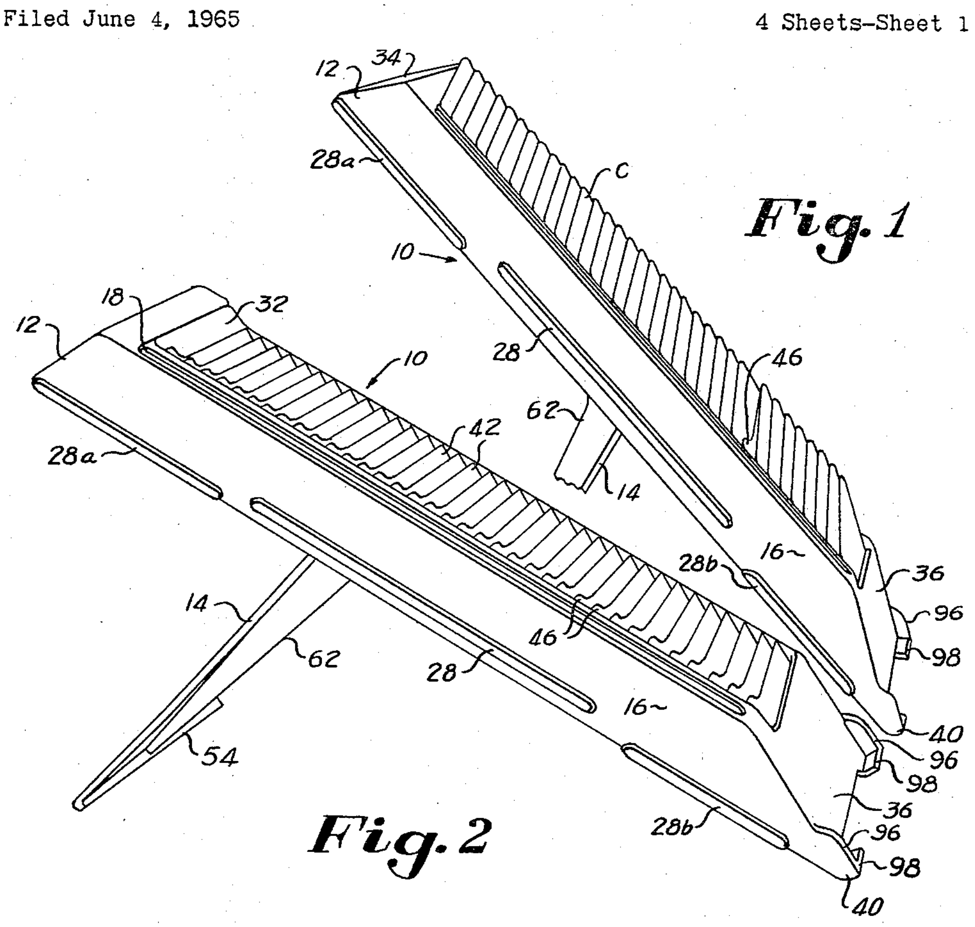
FIG. 1 is a left hand perspective view of a card file constructed in accordance with the present invention, and shows the cards filed therein.
FIG. 2 is a view similar to FIG. 1 but showing the card file at a different elevational angle and with the cards removed to show card separator plates.

The card file according to the present invention is indicated generally at 10 in FIGS. 1 and 2, and comprises a tray 12 having a plurality of vertically spaced pockets therein for filing embossed plastic cards and/or metal address plates C in a shingled row. The tray is also provided with a removable stand member 14 which permits positioning of the tray at different elevational angles as will be further explained hereinafter.

Figures 5, 6:
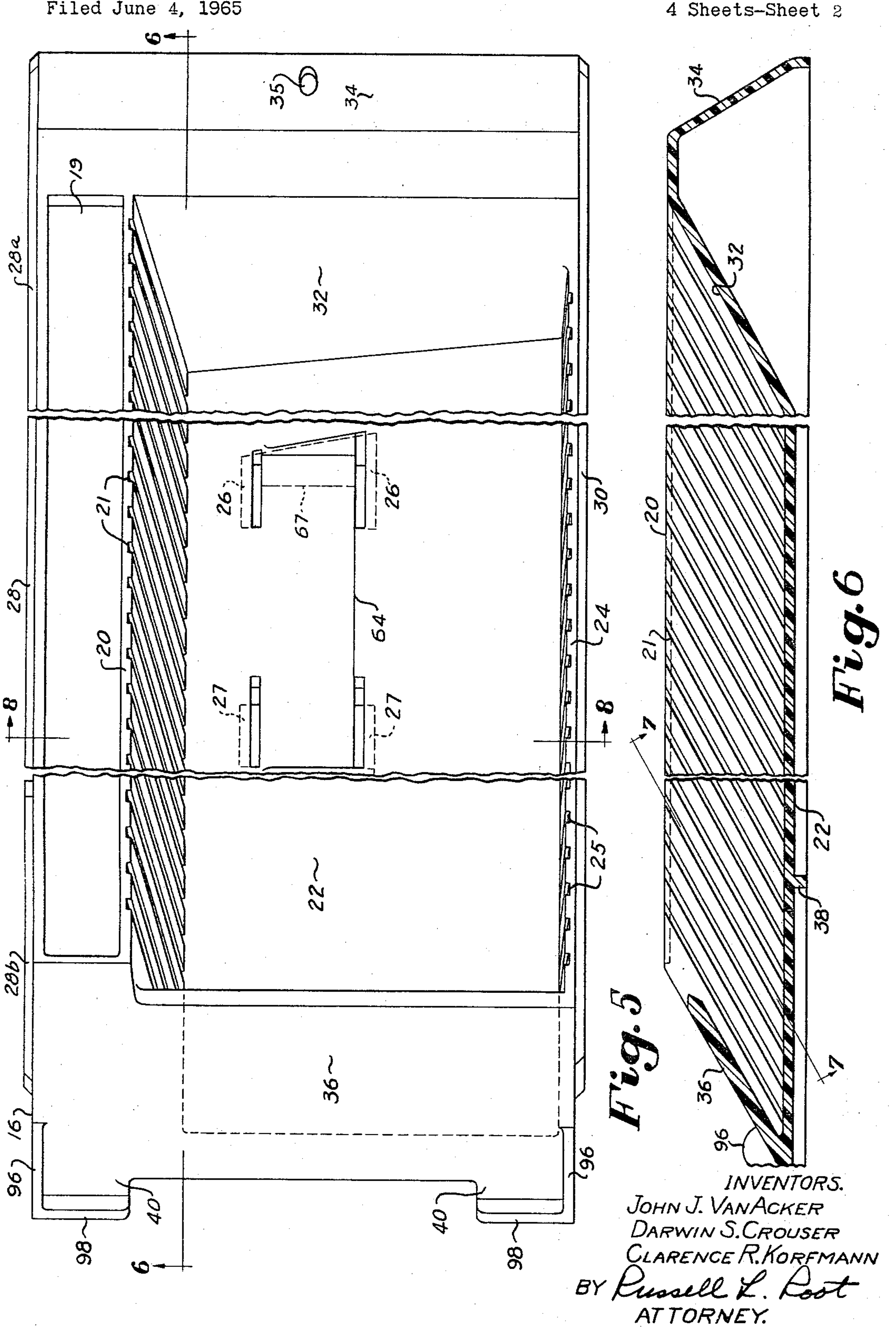
FIG. 5 is a condensed plan view of the card file with the separator plates and the cards removed.
FIG. 6 is a section on line 6—6 of FIG. 5.

As shown in FIGS. 5, 6, 7 and 8 (and considering the tray as lying on a horizontal surface) the tray 12 is preferably made of molded plastic and provides a rigid, durable unit of unitary construction comprising an outer side plate 16 joined to a horizontal section 18 at its top edge and a channel comprising, a left side wall 20 depending from the section 18 and angled away from the outer side plate at an angle of about 23 degrees, a laterally inclined bottom 22 forming an angle with the left side wall 20 of about 107 degrees, and a right side wall 24 forming an angle with the bottom of about 96 degrees. One face of the left side wall 20 is provided with a plurality of parallel diagonal grooves 21 therein in opposed relation to like parallel diagonal grooves 25 provided in the inside face of the right side wall 24. These grooves, as seen in elevation, form an angle with a datum plane (defined hereinafter) of about 30 degrees, as can be seen in FIG. 6. Another way of stating this relationship is that the planes defined by each opposed pair of grooves occupy positions such that the minimum angle between each plane and the lengthwise axis of the channel is about 30°. The bottom 22 is provided with two pairs of depending legs 26, 26 and 27, 27 for releasably retaining the stand 14, and the side plate 16 and right side wall 24 are provided with dovetail connectors 28, **28*a*, 28*b*, and 30** respectively for a purpose to be explained hereinafter.

With reference to FIGS. 5 and 6, it will be seen that one end of the bottom 22 is molded continuously with an inclined surface 32 parallel to the grooves 21 and 25, and which blends in smoothly with the top edges of the side walls and then drops off at an angle to form an end wall 34 at the upper end of the tray 12. The other end of the bottom 22 also provides an inclined surface which forms an end wall 36 at the lower end of the tray 12 and parallel to the grooves and to the inclined surface 32. The lower edges of the side plate 16 and the walls 24, 34 and 36 define a datum plane, generally parallel to the face of the file, which may serve as a convenient reference to which various directions and angles may be related. Stiffening ribs, such as the one shown at 38 in FIG. 6, may also be provided at suitable locations across the bottom 22 to add rigidity to the tray construction. A pair of feet 40, extending downwardly beyond the end wall 36 in the plane thereof at the lower end of the tray, are also provided, and will be further described hereinbelow.

Figure 12:
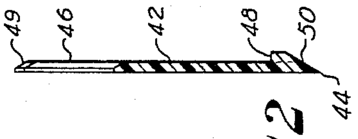
FIG. 12 is a section on line 12—12 of FIG. 11.
Figure 11:
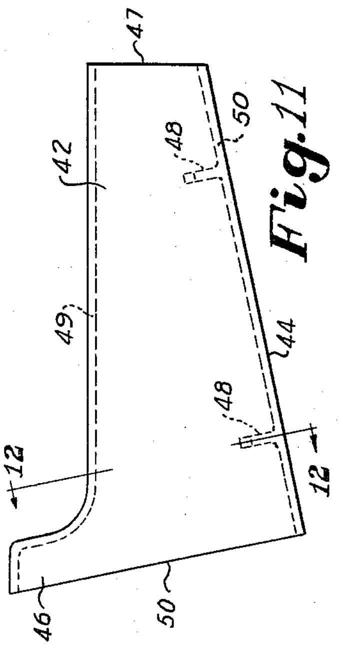
FIG. 11 is a face view of one of the card separator plates.

As mentioned above, each of the diagonal grooves 21 in the left side wall 20 is opposed to a like diagonal groove 25 in the right side wall 24. Thus, each pair of opposed grooves provides for the retention of a separator plate 42 which is adapted to be positioned therein. As seen in FIGS. 2, 11 and 12, the separator plate 42 is designed to provide a fairly long vertical dimension at its left side 50 which is angled to conform to the slope of the side wall 20 and which terminates in an extended ear 46, a reduced vertical dimension at its right side 47, and a transversely angled bottom edge 44 which conforms to the inclined bottom 22 for a purpose to be explained below. Additionally, a pair of spaced integrally formed members 48, which constitute combined spacers and ledges, are provided on one face of the separator, adjacent the bottom edge 44 and perpendicular thereto, and afford a support for the cards and/or plates C as will also be further explained hereinafter. The top and bottom edges of the separator are also preferably beveled on the same surface as that from which the ledges project, as indicated by numerals 49 and 50, for purposes which will presently appear.

The separators 42 may also be made of plastic, and one separator is required for each opposed pair of grooves 21 and 25 in the card tray. While the separators are adapted to be releasably retained by the grooves, it is preferable that the thickness of the separators and the width of the grooves be such that the separators fit snugly in the grooves to prevent unintentional dislodgement thereof. If desired, the side margins of the separators may be provided with raised protuberances or the like (not shown in the drawings) to further provide a snug interference fit of the separators within the grooves and to prevent the separators from accidentally falling out of the tray 12. The separators are manually positioned in the grooves and afford a series of individual, vertically spaced card retaining pockets as shown in FIG. 2 of the drawings.

The separators 42 may be made of a color contrasting to the cards C, or only the ear 46 may be of a contrasting color, to serve as a positive reference for quick return of the card to its proper place in the file as shown in FIG. 1.

Figure 7:
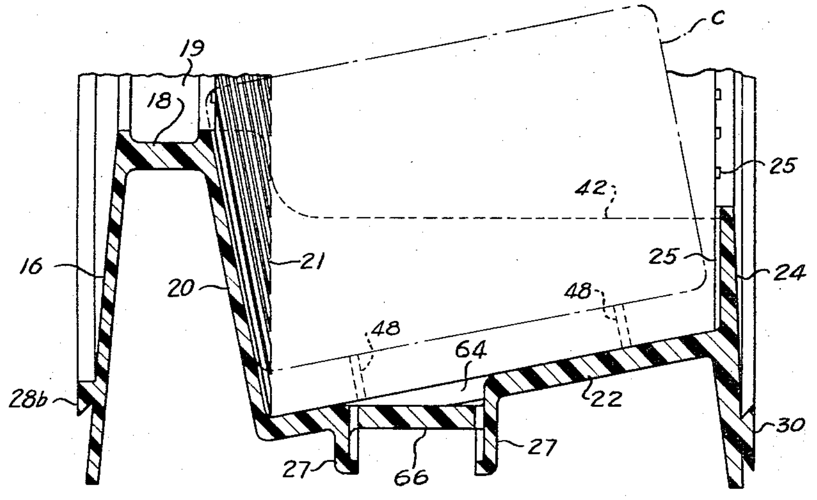
FIG. 7 is essentially a section on line 7—7 of FIG. 6 but showing a separator and a card in phantom.

It can be seen from FIGS. 7 and 11 that the combined effect of the various angularities is such that the edges forming the lower left hand corner of each separator are at right angles, and the surfaces of the tray with which the separator is to fit are similarly related. While this is not altogether essential, it is a convenient arrangement and provides a sloped pocket with a positioning corner for the card, i.e. a lefthand corner which is lower than the right corner whether the tray is supine or standing erect. The lower beveled edge 50 of the separator is designed to match the surface of the bottom 22 at that location and to fit snugly thereagainst.

Figure 3:
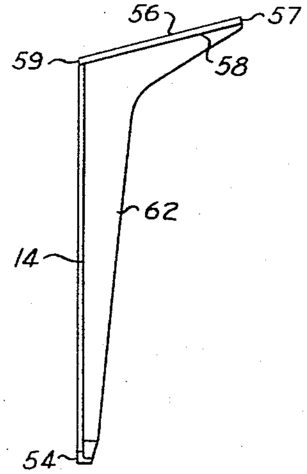
FIG. 3 is a side elevation of a stand member for supporting the card file.
Figure 4:
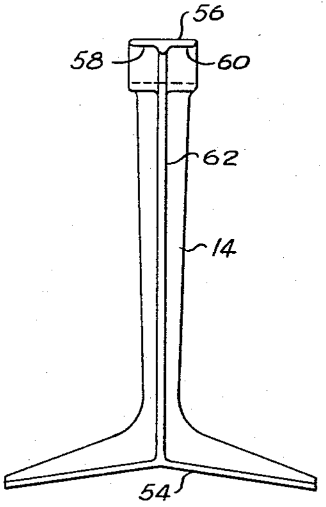
FIG. 4 is a front elevation of the stand member.

The stand 14 for supporting the card file is best shown in FIGS. 2, 3 and 4, and comprises a vertical body having a substantially T-shaped cross section. The bottom end of the body flares outwardly in opposed directions to form an extended support or foot 54, and the upper end of the body is provided with a head 56 which is slightly angled with respect to the body. The head 56 is also substantially T-shaped in cross section, as formed by a pair of ribs 58 and 60 which blend into a rib 62 provided on the body of the stand 14.

Figures 8, 9:
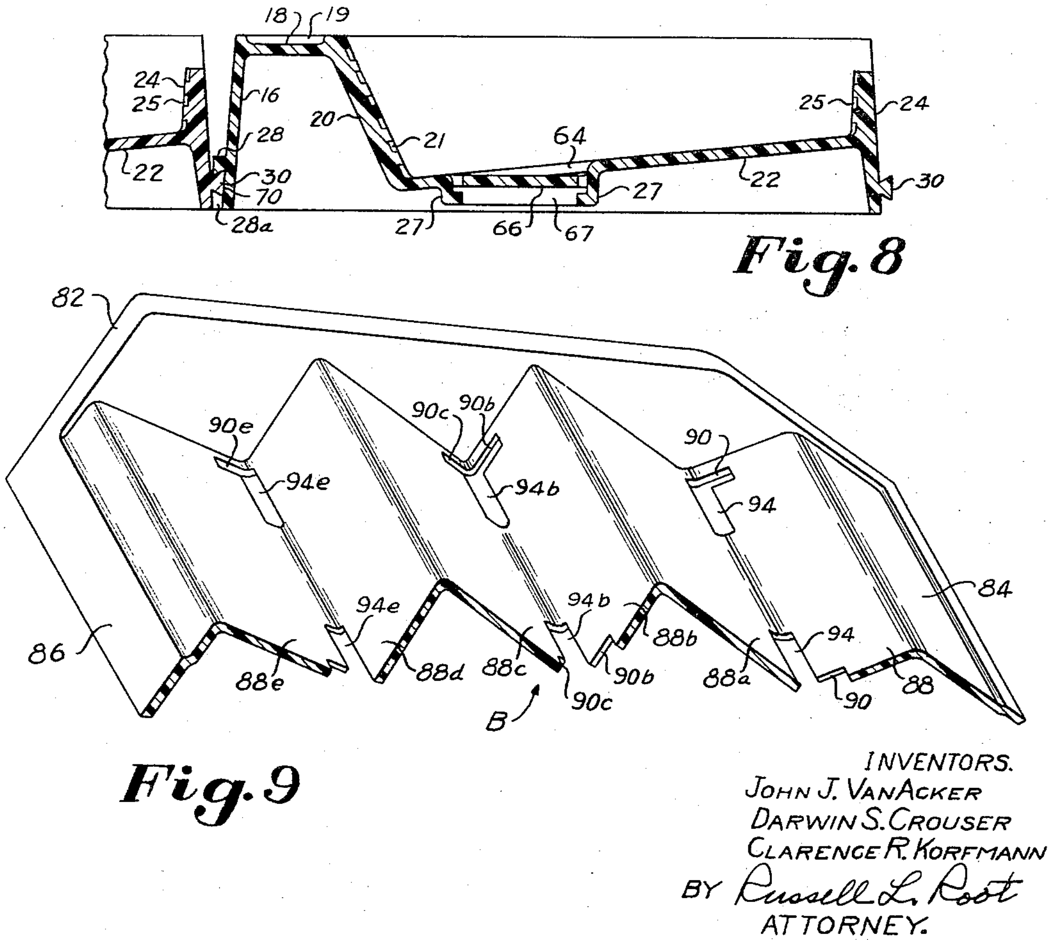
FIG. 8 is a sectional view analogous to a section taken on line 8—8 of FIG. 5, but showing on a reduced scale a pair of card files mounted together in a side by side relation.
FIG. 9 is a top perspective view in section, taken substantially on line 9—9 of FIG. 10, but with the card files removed, showing details of the base for holding a plurality of card files.

With reference to FIGS. 5, 7 and 8, the stand 14 is adapted to be positioned with its head 56 located between the legs 26 and 27 to support the card file 10 at either of two different elevational positions as shown in FIGS. 1 and 2. However, since the bottom 22 of the tray 12 is laterally inclined, and in order that the tray may stand erect when it is supported by the foot 14, the bottom 22 in the area between the legs 26 and 27 is depressed as indicated at 64 to form a flat bottom surface portion 66 which is parallel to the datum plane, and whose upper end terminates at an abutment surface 67.

For purposes of explanation, the head 56 of the stand 14 may be said to have a lead end 57 and a trailing end 59 as indicated in FIG. 3. Accordingly, because of the angle of the head 56, when the head is positioned against the surface 66 with the ribs 58 and 60 of its lead end 57 engaged by the legs 27 and its trailing end 59 between the legs 26 and in engagement with abutment 67, the tray will assume the low sloping position shown in FIG. 2. On the other hand, the stand may be reversed by sliding the head 56 out from between the legs and repositioning it against the surface 66 with the trailing end 59 between the legs 27 and the lead end 57 between the legs 26 and in engagement with the abutment 67. This, as a result of the angled head 56, provides a steeper angle of inclination to the card file as indicated in FIG. 1.

From the foregoing, it will be appreciated that this construction provides a convenient arrangement for quickly and easily supporting the card file at different elevational positions. Additionally, the stand may be removed from the tray in those instances where it is desired to maintain the card file in a flat position on a table top, in a desk drawer or the like. Also, the end wall 34 of the tray may be provided with a hole 35 whereby the card file may be hung on a vertical wall or the like when convenient.

The present invention also provides for attaching several card files in side by side relation. This is accomplished by incorporating dovetail connectors 28, **28*a*, 28*b*** and 30 on the side plate 16 and side wall 24 respectively, as shown in FIGS. 1, 2, 5 and 8 of the drawings. For purposes of simplifying the molding process of the tray, the dovetail connector on side plate 16 comprises three separate members indicated 28, 28*a* and 28*b*. Connectors 28*a* and 28*b* are provided one at each end of the side plate 16 with their bottom edges flush with the bottom edge of the side plate, and connector 28 is provided between the connectors 28*a* and 28*b* with its bottom edge slightly raised from the bottom edge of the side plate 16. With reference to FIG. 8, the upper edges of connectors 28*a* and 28*b* are angled downwardly toward the side plate, and the bottom edge of connector 28 is angled upwardly toward the side plate, thus forming between the angled edges a dovetail opening indicated at 70.

Connector 30 on the right side wall 24 is a single long rib projecting therefrom and having a cross section conforming in shape to the opening 70 afforded by the connectors 28, 28*a* and 28*b*. As shown in FIG. 8 of the drawings, connector 30 is spaced from the bottom edge of side wall 24 a distance equal to the spacing of opening 70 from the bottom edge of side plate 16. In this way, it will be observed that any number of files 10 may be readily attached in side by side positions merely by longitudially sliding the connector 30 on the side wall into the opening 70 provided on the side plate of an adjacent tray, as clearly shown in FIG. 8.

Figure 10:
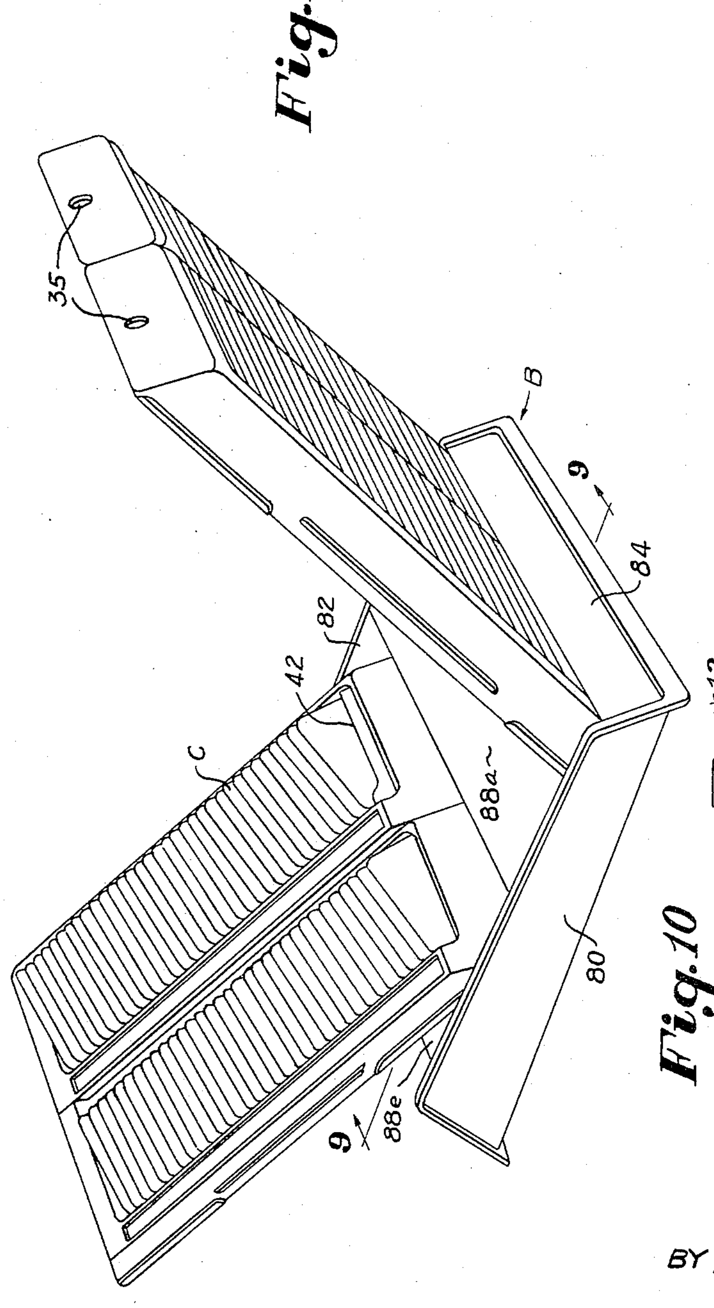
FIG. 10 is a top perspective view showing a plurality of card files positioned in the base.

Still another arrangement for supporting the card files 10 is shown in FIG. 10, wherein pairs of files are connected side by side and mounted one pair behind the other, with provisions for pivoting the front pair of files forward to gain access to the back row. This is achieved by providing a base indicated generally at B, preferably of molded plastic, as shown in FIGS. 9 and 10. Although the base may be made to accommodate any reasonable number of card files, the base shown in the drawings and described hereinafter is adapted to support four files.

As seen in FIGS. 9 and 10, the base B is provided with a pair of sides 80 and 82 having downwardly tapered ends which are joined together by end walls 84 and 86, and between the side plates are provided a series of V-shaped file supporting elements comprising interconnecting angled surfaces 88, 88*a*, 88*b*, 88*c*, 88*d* and 88*e*, thus providing a self-supporting base of unitary construction. The angles of these surfaces are such that surfaces 88*a* and 88*c* afford one angle of inclination while surfaces 88*b* and 88*d* afford a different angle of inclination for a purpose to be explained hereinafter.

Surface 88 is provided with an elongate slot 90, adjacent the side 82 and parallel therewith, which terminates in an opening 94 provided at the bottom of the V formed by the surfaces 88 and 88*a*. A similar slot and opening (not shown in the drawings) are provided adjacent the other side 80, and also at positions intermediate the sides 80, 82 such that the lateral distance from one slot to another corresponds to the distance between the feet 40 of the card file. The other surfaces 88*b*, 88*c* and 88*e* are provided with like slots 90*b*, 90*c* and 90*e* respectively. However, and as shown in FIG. 9, since the slots 90*b* and 90*c* intersect at the bottom of the V formed by surfaces 88*b* and 88*c*, only a single opening 94*b* is provided for both slots. On the other hand, slot 90*e* is associated with an opening 94*e* in the same way as slot 90 is related to opening 94.

With reference to FIGS. 1, 2 and 5, the feet 40 of the card file are each provided with a vertical web and cam section 96 and a locking lip 98 which cooperate with the aforementioned slots and openings to effect a pivotal connection of the file to the baese as will now be explained. With the file held in a vertical position, the feet 40 are positioned wihtin a pair of openings 94 so that the web sections 96 of the feet enter the pair of slots 90. As the file is tilted back to rest against the surface 88*a*, the vertical sections 96 move into the slots 90, and the locking lips 98 engage the underside of surface 88 along one edge of the opening 94. In this position, the file is supported by the surface 88*a*, and is securely held in place by the interlocking relation of the feet with the openings and the slots.

Similarly, another file may be positioned with the feet 40 of the tray in the slots 90*b* and openings 94*b* in a position directly behind the first file, such that it will rest against surface 88*c* which, as mentioned earlier, is parallel with surface 88*a*. Additionally, two or more files may be attached side by side, through the provisions of the dovetail connections described hereinabove and positioned in the base as shown in FIG. 10. The front pair of files may be pivoted forward to rest on the surface 88, to thereby gain access to the files therebehind, and still maintain locked engagement of the feet 40 with the slots and openings.

In this forwardly tipped position the back surfaces of the projecting feet 40 are intended to react against the edges of openings 94 to provide a balancing torque for that induced by the weight of the file. The purpose of the web sections 96 is not only to brace and strengthen the locking lip 98, but also to act as a cam and engage against the ends of the slots 90, if necessary, to insure a slight rearward displacement of the lower end of the file sufficient that the back of feet 40 will safely overlap the edges of openings 94. This prevents the feet 40 from inadvertently leaving the slots 90 during the swinging motion and allows the file to stand in the forwardly sloping position without falling, and without any particular precautions to this end being required on the part of the user.

The removal of the files from the base merely requires that the files be moved to a vertical position wherein the feet may be withdrawn from the openings by lifting the files upwardly.

In the event it is desired to change the angular position of the files resting on surfaces 88*a* and 88*c*, they may be removed from the base and repositioned in the slots 90*c* and 90*e* provided in surfaces 88*c* and 88*e* respectively, such that the files rest against the surfaces 88*b* and 88*d* which have a steeper angle of inclination than the surfaces 88*a* and 88*c*. In this position, also, the front files may be pivoted forward to rest against surface 88*e*, as shown in FIG. 10, to permit access to the rear files.

A summary of a typical application utilizing the card file of the present invention will now be given. With the cards positioned in the file as shown in FIG. 1, each card is supported in a vertical overlapping position with the top edge of each successive rear card projecting above the one in front. In this way, the first line of embossing on each of the cards is exposed to permit viewing the cards for selection and removal from the file. Further card identification means may be provided on the card file if desired by utilizing an adhesive backed index strip positioned in a channel 19 afforded in the section 18 along the left margin of the tray. Although not shown in the drawings, such an index strip may provide suitable indicia such as numerals or letters to facilitate location of the cards in the file.

Because of the angled arrangement of the separators 42 which support the cards on the ledges 48, the cards are caused to settle against the inner wall 20 of the tray when they are dropped in place, thus keeping them in alignment and making the unit particularly adaptable to various width cards. The slanted design also places the top right-hand corner of the card in an accessible position projecting upwardly and forwardly where it can be easily grasped for removal. In conjunction with this arrangement, and to further simplify the card removal procedure, it will be noted that the support ledge on which the card rests terminates short of the right end of the card, thus permitting the card to be pivoted or rocked to the right. This moves the right top corner out of line with the adjacent cards to a position such that it can be readily grasped between thumb and forefinger. Also, by reducing the vertical dimension on the right side of the separator 42, the card directly above and behind the one being selected is allowed to be flexed rearwardly somewhat, if necesary, to provide additional finger clearance when removing a card from the tray.

The upper left-hand side of each separator is provided with the ear 46 which is sufficiently high to be visible above the card in front when the selected card is removed, as shown in FIG. 1. This ear, which is of contrasting color, serves as a positive reference for quick return of the card to its proper place in the file. After the card has been used in a data recorder, or the like, to imprint a form, all that is necessary to replace the card in the file is to place the lower left hand corner of the card against the exposed ear 46, generally align the card with the associated pocket just ahead of this ear, and drop the card. By gravity the card automatically settles to a predetermined position with its left edge against the inner wall 20 and its bottom resting on the ledge members 48 of the separator plate just ahead of it. The beveled upper edge 49 of this latter separator avoids the possibility that the card may hang up during the insertion or settling process.

From the foregoing description, it will be appreciated that the card file of the present invention provides a novel arrangement for storing embossed plastic cards and/or metal address plates. The angular construction of the card pockets and separator plates afford means for self-positioning of the cards in controlled alignment against one edge of the file, and also maintain the cards at a highly convenient position for the removal of the cards from the file. Additionally, the separator plates provide a positive visual index for the quick return of a card to its proper place in the file.

The dovetail connectors permit side by side attachment of any number of files to provide a single unit of greater capacity, and are particularly suited to attaching the files in pairs for mounting in the base. The means for interlocking the files in the base allows pivoting of the files to gain access to other files in the base, and also provides a self-locking feature which prevents accidental disengagement of the files from the base.

While preferred embodiments of the invention have been described and illustrated, it is to be understood that these are capable of variation and modification. Accordingly, the aim in the appended claims is to cover all such variations and modifications as may fall within the true spirit of the invention.

What is claimed is:

1. A card file for retaining cards of uniform height in a shingled row with just sufficient separation for ready individual grasping, comprising:

a tray having a bottom, and a side wall;

said bottom having a width dimension and a length dimension;

said bottom and sidewall defining an obtuse angle therebetween;

a plurality of separator plates affixed in said channel in closely spaced parallel relationship and forming a plurality of thin pockets to each receive an individual card of length less than the width of the tray;

each plate having a bottom edge substantially abutting said tray bottom;

each plate having a side edge in substantially right angular relationship to said plate bottom edge;

each said plate lying at an acute angle to the length dimension of said bottom at a position placing said separator plate side edge substantially abutting to said side wall;

each adjacent pair of separator plates forming a sloping card retaining pocket such that cards will settle by gravity to the bottom of the pocket in a wide range of file positions including horizontal, and such that the cards will also settle by gravity to an aligned position with one edge thereof against the side wall.

2. A card file as set forth in claim 1 in which means is provided in each pocket for supporting a card therein, said means terminating short of the right end of a card to provide a fulcrum for rocking the card away from its normal position to facilitate grasping thereof.

3. A card file as set forth in claim 1, in which the tray bottom includes means for releasably retaining a stand for supporting the card file at different elevated angles, said means comprising a flat section provided on the under side of the bottom and parallel to the face of the file;

a set of legs depending from the bottom and disposed normal to the flat section;

said legs and said flat section providing therebetween an opening for the slidable reception and retention of a portion of the stand for supporting the card file;

a stand comprising an upright body having an angled head at one end thereof; and said head adapted to be reversibly positioned within the retaining means to thereby support the card file at either of two different angular positions.

4. A card file as set forth in claim 1 in which the angular position of the plates with respect to the bottom is such that the minimum angle which they make with the lengthwise axis of the channel is about 30°.

5. A card file as set forth in claim 1 further characterized in that:

said side walls have each an inside face provided with a plurality of parallel diagonal grooves therein, each groove in each side wall being in opposed relation to one of the grooves in the other side wall, and each opposed pair of grooves receives and retains one of the separator plates.

6. A card file as defined in claim 1, further characterized in that each separator plate has an integral ledge projecting from its face toward the adjacent separator plate to form a support for the card housed therein above the bottom of the pocket defined by the junction between the separator and the file bottom, said ledge spaced from said side wall a distance less than the lateral dimension of a card to be carried therein, whereby a card may be pivoted about said ledge as a fulcrum to move the top corner out of line with adjacent cards.

7. A card file as defined in claim 1 in which said side edge of each separator plate is a first side edge substantially equal to the adjacent distance along the side wall;

said separator plate having a second side edge along said second side wall substantially equal to the adjacent distance along said second side wall, said plate top edge extending from said second side edge in a lateral direction and terminating in an extended ear along said first side edge, the height of the ear and the depth of the pocket being coordinated with the cards to be stored so that the card covers the ear while in the pocket, and the ear stands out in contrast to the row of cards whenever one card is removed.

8. Card file means as set forth in claim 1 in which the card file includes a pair of feet provided at one end of the tray;

said feet each having a vertical web section and a locking lip for retaining the tray in a base;

and which further includes a base adapted to hold the card file, and comprising a series of interconnected angled surfaces for supporting the card files;

said angled surfaces being provided with means which coact with said feet to maintain the tray releasably associated with the base.

9. Card file means as set forth in claim 8 in which the association maintaining means comprises a pair of slots and a pair of openings for each card tray;

said slots coacting with the vertical sections of the feet and the openings coacting with the locking lips of the feet to provide releasable locking engagement of the trays in the base.

References Cited

UNITED STATES PATENTS

| | | | |
|---|---|---|---|
| 1,273,894 | 7/1918 | Madison | 206—73 |
| 2,412,246 | 12/1946 | Blumenstein | 88—28 |
| 2,691,447 | 10/1954 | Schiffer | 206—73 X |
| 2,701,635 | 2/1955 | Mills | 206—16 X |
| 2,829,767 | 4/1958 | Scripture | 206—73 |
| 2,860,810 | 11/1958 | Sargent | 129—43 X |
| 2,919,021 | 12/1959 | Robinson et al. | 206—73 X |
| 3,147,151 | 9/1964 | Toce | |
| 3,164,430 | 1/1965 | Beem et al. | |

FOREIGN PATENTS

| | | |
|---|---|---|
| 31,089 | 12/1960 | Finland. |
| 1,187,853 | 3/1959 | France. |
| 747,440 | 9/1944 | Germany. |
| 828,405 | 2/1952 | Germany. |
| 1,106,983 | 5/1961 | Germany. |
| 244,234 | 1/1926 | Italy. |
| 244,356 | 4/1947 | Switzerland. |
| 378,063 | 7/1964 | Switzerland. |

JOSEPH R. LECLAIR, *Primary Examiner.*

THERON E. CONDON, *Examiner.*

J. M. CASKIE, *Assistant Examiner.*